United States Patent
Heymans

(10) Patent No.: US 8,332,391 B1
(45) Date of Patent: Dec. 11, 2012

(54) METHOD AND APPARATUS FOR AUTOMATICALLY IDENTIFYING COMPOUNDS

(75) Inventor: Maureen Heymans, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/328,645

(22) Filed: Dec. 16, 2011

Related U.S. Application Data

(63) Continuation of application No. 11/651,282, filed on Jan. 9, 2007, now Pat. No. 8,086,599.

(60) Provisional application No. 60/854,316, filed on Oct. 24, 2006.

(51) Int. Cl.
*G06F 17/30* (2006.01)

(52) U.S. Cl. .......................................... 707/721; 707/722

(58) Field of Classification Search .................. 707/721, 707/722
See application file for complete search history.

(56) References Cited

U.S. PATENT DOCUMENTS

| | | | |
|---|---|---|---|
| 6,078,916 A * | 6/2000 | Culliss ................................. | 1/1 |
| 6,374,241 B1 | 4/2002 | Lamburt et al. | |
| 7,406,465 B2 | 7/2008 | Jones et al. | |
| 2004/0236736 A1 | 11/2004 | Whitman et al. | |
| 2005/0222998 A1 * | 10/2005 | Driessen et al. ................... | 707/4 |
| 2006/0026152 A1 * | 2/2006 | Zeng et al. ......................... | 707/5 |
| 2008/0195601 A1 | 8/2008 | Ntoulas et al. | |
| 2011/0016106 A1 * | 1/2011 | Xia ................................ | 707/706 |

\* cited by examiner

*Primary Examiner* — Amresh Singh
(74) *Attorney, Agent, or Firm* — Fish & Richardson P.C.

(57) ABSTRACT

One embodiment of the present invention provides a system that automatically identifies compounds, such as bigrams or n-grams. During operation, the system obtains selections of search results which were selected by one or more users, wherein the search results were previously generated by a search engine in response to queries containing search terms. Next, the system forms a set of candidate compounds from the queries, wherein each candidate compound comprises n consecutive terms from a query. Then, for each candidate compound in the set, the system analyzes the selections of search results to calculate a likelihood that the candidate compound is a compound.

27 Claims, 4 Drawing Sheets

METHOD AND APPARATUS FOR AUTOMATICALLY IDENTIFYING COMPOUNDS

CROSS-REFERENCE TO RELATED APPLICATION

This application is a continuation of U.S. patent application Ser. No. 11/651,282, filed on Jan. 9, 2007 which claims priority under 35 U.S.C. §119 to U.S. Provisional Patent Application No. 60/854,316, filed on 24 Oct. 2006, entitled "Method and Apparatus for Automatically Identifying N-Grams", which are herein incorporated by reference in their entirety

BACKGROUND

1. Field of the Invention

The present invention generally relates to the field of information retrieval, and more specifically to the problem of automatically identifying compounds (such as bigrams or more generally n-grams) in search queries to facilitate generating better search results.

2. Related Art

The World Wide Web (web) contains a vast amount of freely available information. However, locating a relevant item of information on the web can be a challenging task, and the magnitude of this problem is increasing as the amount of information available on the web continues to grow.

Search engines can often help users to locate and retrieve a document of interest on the web. They typically operate by receiving a query containing a set of search terms and then looking up web pages containing the search terms (or related terms). During this process, it is useful to know whether two words constitute a bigram. For example, the words "San Francisco" form a bigram because they typically appear together in sequence and they collectively represent a single location—the city of San Francisco. The knowledge about whether consecutive words in a query constitute a bigram can be used to effectively narrow search results. For example, if "San Francisco" is known to be a bigram and appears in a query, then the search engine can ignore web pages in which the terms "San" and "Francisco" appear separately and are not part of the bigram "San Francisco." (Note that a bigram is a special case of an n-gram, which as also referred to as a "compound".)

Furthermore, knowledge about bigrams can be used to "score" web pages, which facilitates returning web pages that are most likely to be of interest to a user. For example, consider the bigram "larry page". The individual unigrams "larry" and "page" do not mean much by themselves, while the bigram "larry page" tells us much more about the meaning of a query containing this bigram. Note that while scoring web pages, we do not have to ignore pages which do not contain the bigram, we can simply promote pages which contain it. Another example is the query "real estate post office new lebanon new york". Not every pair of consecutive terms in this query forms a bigram. In this query, only "real estate", "post office", "new lebanon" and "new york" form meaningful compounds.

Unfortunately, it is often hard to determine whether consecutive words in a query are part of a compound or are separate words. For example, it is hard to differentiate bigrams such as "London hotels", which is not a good bigram, from a good bigram such as "Gallery Hotel", which is the name of a hotel. In some cases, it is possible to examine an encyclopedia or dictionary to identify specific compounds. However, these information sources do not contain a comprehensive list of compounds, and they also might not contain compounds that came into existence recently, such as names of celebrities or new video games.

Hence, what is needed is a method and an apparatus for automatically identifying compounds.

SUMMARY

One embodiment of the present invention provides a system that automatically identifies compounds, such as bigrams or n-grams. During operation, the system obtains selections of search results which were clicked on by one or more users, wherein the search results were previously generated by a search engine in response to queries containing search terms. Next, the system forms a set of candidate compounds from the queries, wherein each candidate compound comprises n consecutive terms from a query. Then, for each candidate compound in the set, the system analyzes the selections of search results to calculate a likelihood that the candidate compound is an compound.

In a variation on this embodiment, obtaining the selections of search results involves first receiving a query comprised of search terms, and then using the search engine to produce search results for the query, wherein the search results include documents associated with search terms in the query. Next, the system presents a summary of the search results to a user, wherein for each document, the summary includes a title of the document and/or one or more snippets from the document. Finally, the system receives the selections of search results from the user.

In a variation on this embodiment, while analyzing the selections of search results to determine a likelihood that a candidate compound is a compound the system performs a number of operations. First, the system determines the number of selections of search results having summaries that contain the candidate compound. Next, the system divides the determined number of selections containing the candidate compound by a total number of selections to produce a ratio. Finally, the system uses the ratio to determine the likelihood that the candidate compound is a compound.

In a variation on this embodiment, receiving a selection from the user involves receiving information indicating whether the user spent a significant amount of time viewing or using the document after selecting the document.

In a variation on this embodiment, while determining a likelihood that a candidate compound is a compound, the system uses context information specifying terms immediately surrounding the candidate compound to determine a conditional probability that the candidate compound is a compound in the context of the immediately surrounding terms.

In a variation on this embodiment, analyzing the selections of search results involves determining whether to split a candidate bigram, which involves keeping track of selections of search results with summaries containing terms from the candidate bigram, wherein the terms do not appear adjacent to each other.

In a variation on this embodiment, analyzing the selections of search results involves analyzing selections from a large number of users to calculate the likelihood that the candidate compound is a compound.

In a variation on this embodiment, the system uses the calculated likelihood for a compound to rank documents returned by the search engine in response to a query containing the compound.

In a variation on this embodiment, the system additionally uses a list of compound words obtained from an encyclopedia to identify compounds.

In a variation on this embodiment, a snippet of a document is a section of the document containing at least one search term with surrounding text.

In a variation on this embodiment, the documents are web pages and wherein the search engine is a web search engine.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Crawling Ranking and Searching Processes

Figure 1:
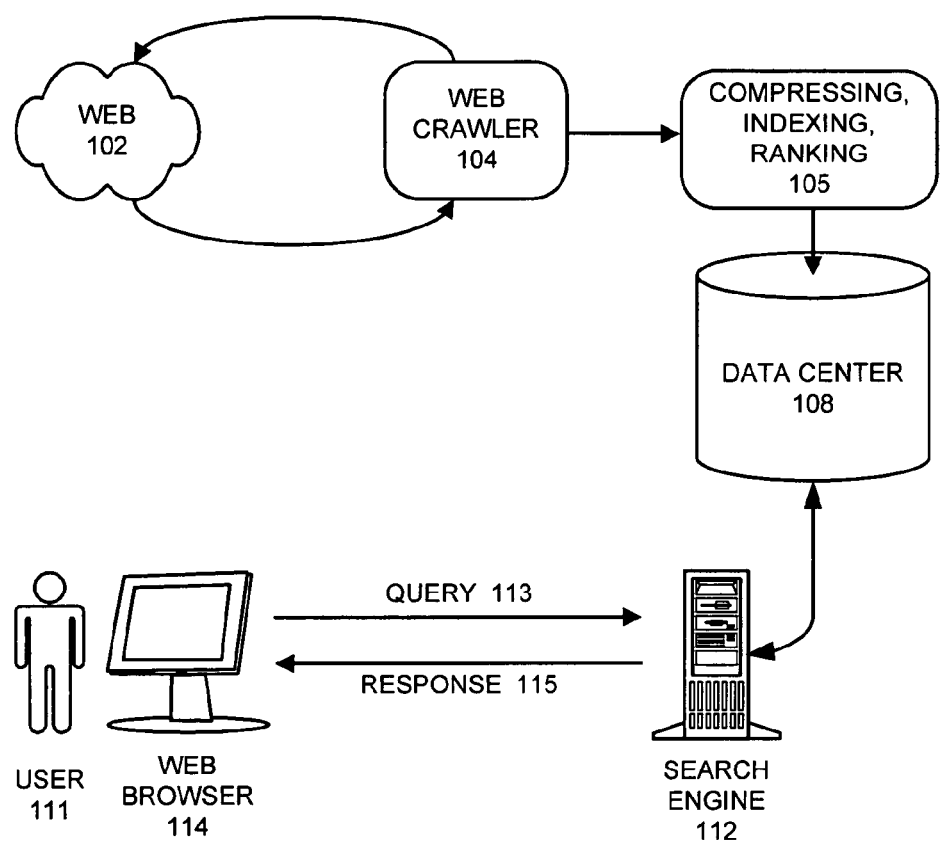
FIG. 1 illustrates the crawling, ranking and searching processes in accordance with an embodiment of the present invention.

FIG. 1 illustrates the crawling, ranking and searching processes in accordance with an embodiment of the present invention. During the crawling process, a web crawler 104 crawls or otherwise searches through websites on web 102 to select web pages to be stored in indexed form in data center 108. The selected web pages are then compressed, indexed and ranked in module 105 (using the ranking process described above) before being stored in data center 108.

During a subsequent search process, a search engine 112 receives a query 113 from a user 111 through a web browser 114. This query 113 specifies a number of terms to be searched for in the set of documents. In response to query 113, search engine 112 uses search terms specified in the query as well as synonyms for search terms to identify highly-ranked documents that satisfy the query. Search engine 112 then returns a response 115 through web browser 114, wherein the response 115 contains matching pages along with ranking information and references to the identified documents.

Obtaining User Selections

Figure 2:
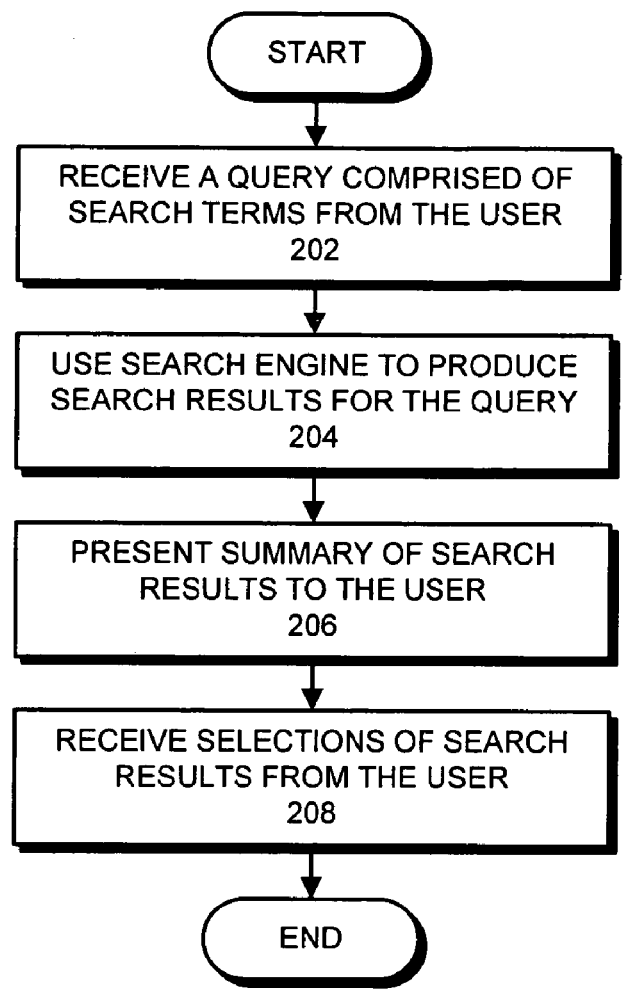
FIG. 2 presents a flow chart illustrating the process of obtaining user selections of search results in accordance with an embodiment of the present invention.

FIG. 2 presents a flow chart illustrating the process of obtaining user selections of search results in accordance with an embodiment of the present invention. First, the system receives a query comprised of search terms from the user (step 202). Next, the system uses a search engine to produce search results for the query, wherein the search results include web pages associated with search terms in the query (step 204). Next, the system presents a summary of the search results to the user (step 206), wherein for each document, the summary includes a title of the document and/or one or more snippets from the document. Finally, the system receives the selections of search results from the user (step 208). Note that a snippet of a document is a section of the document containing at least one search term with surrounding text.

Identifying Compounds

Figure 3:
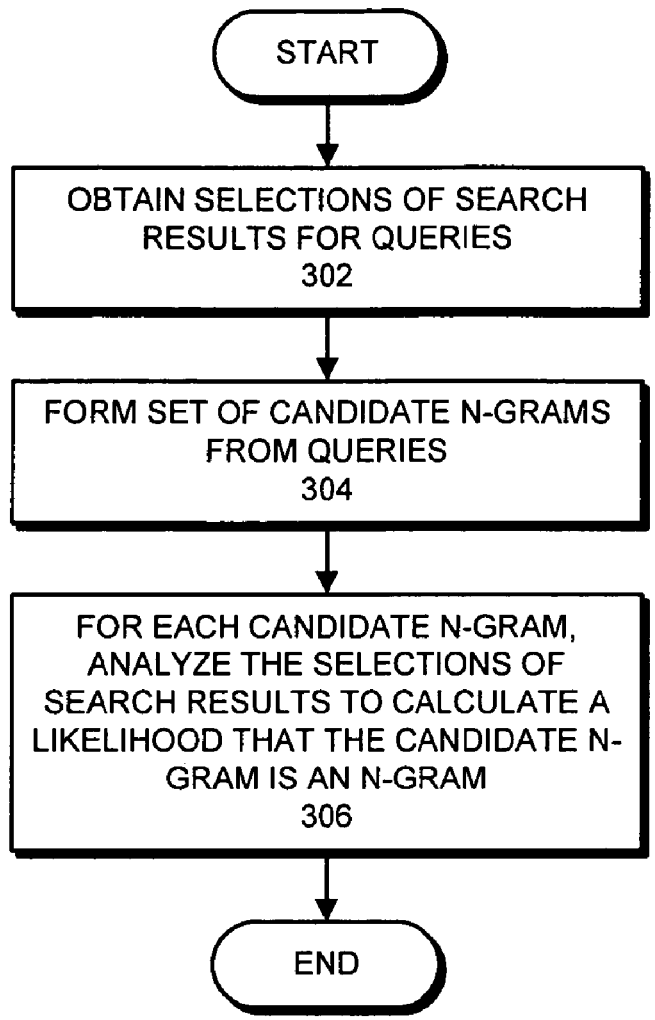
FIG. 3 presents a flow chart illustrating the process of identifying compounds in accordance with an embodiment of the present invention.

FIG. 3 presents a flow chart illustrating the process of identifying compounds in accordance with an embodiment of the present invention. First, the system obtains selections of search results which were selected by one or more users, for example by using the process illustrated in FIG. 2 (step 302). Next, the system forms a set of candidate compounds from the queries, wherein each candidate compound comprises n consecutive terms from a query (step 304). Finally, for each candidate compound in the set, the system analyzes the selections of search results to calculate a likelihood that the candidate compound is a compound (step 306).

Calculating Likelihood of Being an N-Gram

Figure 4:
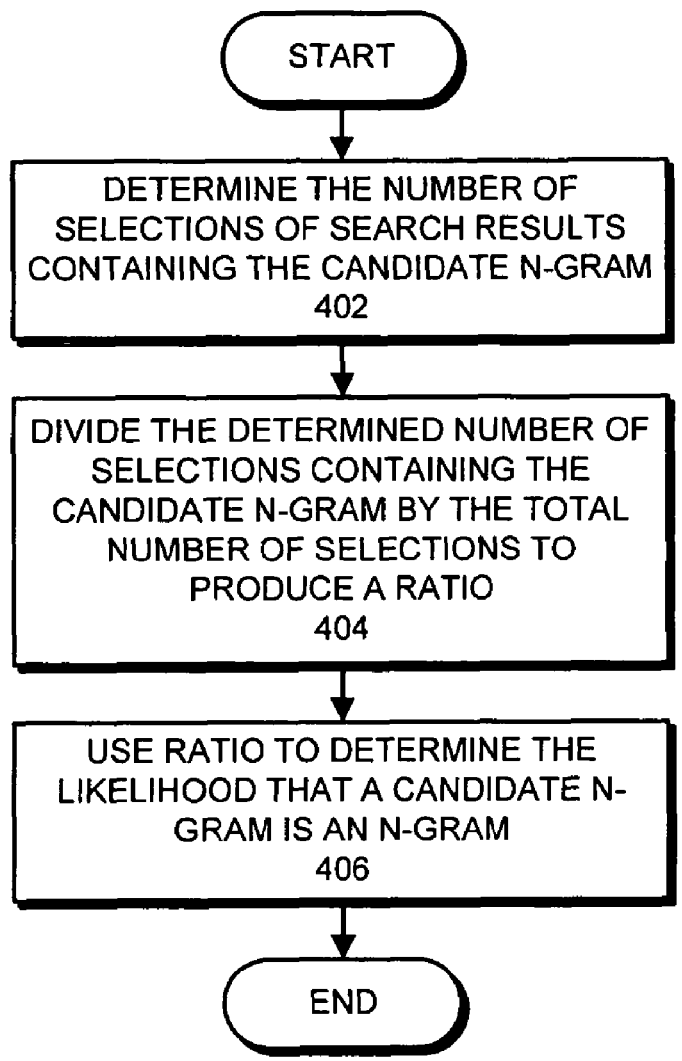
FIG. 4 presents a flow chart illustrating the process of calculating the likelihood that a candidate compound is a compound in accordance with an embodiment of the present invention.

FIG. 4 presents a flow chart illustrating the process of calculating the likelihood that a candidate compound is a compound in accordance with an embodiment of the present invention. (Note that the following operations can all be performed offline.) First, the system determines the number of selections of search results having summaries that contain the candidate compound (step 402). (The system can also consider the number of selections of search results containing terms from the candidate compound, wherein the terms are not part of the candidate compound.) Next, the system divides the determined number of selections containing the candidate compound by a total number of selections to produce a ratio (step 404).

Finally, the system uses the ratio to determine the likelihood that the candidate compound is a compound (step 406). This can involve comparing the ratio against threshold values. For example, if the ratio is greater than 90%, the candidate bigram can be labeled as a "strong bigram." On the other hand, if the ratio is less than 75%, the candidate bigram can be labeled as a "weak bigram."

This process can be used to assign weights to each bigram and the weights can be averaged across different queries containing the bigrams/n-grams.

Finally, the system can use the determined likelihood for each compound to rank documents returned by the search engine in response to a query containing the compound.

Variations

A number of other factors can be considered while identifying compounds, such as bigrams. For example, in one embodiment of the present invention, the system considers whether the user spent a significant amount of time viewing or using the document after selecting the document. This indicates that the document is interesting to the user, as opposed to a document that user only examines briefly.

The system can also use context information specifying terms immediately surrounding a candidate compound in a query to determine a conditional probability that the candidate compound is a compound in the context of the immediately surrounding terms. Using this type of context information can be useful for certain types of compounds.

The system can also determine whether to split a candidate compound by analyzing selections of search results having summaries containing terms from the candidate compound, wherein the terms do not appear as part of the candidate compound.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method comprising:
   identifying two or more consecutive terms in a search query;
   determining a first quantity of search results that (i) are responsive to the search query, and (ii) have been selected by a user;
   determining a second quantity of search results that (i) are responsive to the search query, (ii) have been selected by the user, and (iii) have summaries that include the two or more consecutive terms;
   determining a value using the first quantity and the second quantity; and
   determining a likelihood that the two or more consecutive terms represent a compound based on the value.

2. The method of claim 1, wherein determining a second quantity of search results comprises determining a second quantity of search results that (i) are responsive to the search query, (ii) have been selected by the user, and (iii) have summaries that include the two or more terms, and in which two or more of the terms appear non-consecutively.

3. The method of claim 1, wherein determining the value comprises dividing the second quantity by the first quantity.

4. The method of claim 1, wherein determining the likelihood comprises comparing the value to a threshold.

5. The method of claim 1, wherein a compound is a combination of terms that has a different meaning in combination than the terms do separately.

6. A computer-implemented method comprising:
   identifying three or more consecutive terms in a search query;
   determining a first quantity of search results that (i) are responsive to the search query, and (ii) have been selected by a user;
   determining a second quantity of search results that (i) are responsive to the search query, (ii) have been selected by the user, and (iii) have summaries that include two or more of the consecutive terms;
   determining a value using the first quantity and the second quantity; and
   determining a likelihood that the two or more consecutive terms represent a compound in context of the third term of the three or more consecutive terms, based on the value.

7. The method of claim 6, wherein the summaries comprise titles of the search results.

8. The method of claim 6, wherein the summaries comprise snippets of the search results.

9. The method of claim 6, comprising splitting the two or more terms when the value does not satisfy a threshold.

10. A system comprising:
    one or more computers and one or more non-transitory computer-readable storage devices storing instructions that when executed by the one or more computers cause the one or more computers to perform operations comprising:
    identifying two or more consecutive terms in a search query;
    determining a first quantity of search results that (i) are responsive to the search query, and (ii) have been selected by a user;
    determining a second quantity of search results that (i) are responsive to the search query, (ii) have been selected by the user, and (iii) have summaries that include the two or more consecutive terms;
    determining a value using the first quantity and the second quantity; and
    determining a likelihood that the two or more consecutive terms represent a compound based on the value.

11. The system of claim 10, wherein determining a second quantity of search results comprises determining a second quantity of search results that (i) are responsive to the search query, (ii) have been selected by the user, and (iii) have summaries that include the two or more terms, and in which two or more of the terms appear non-consecutively.

12. The system of claim 10, wherein determining the value comprises dividing the second quantity by the first quantity.

13. The system of claim 10, wherein determining the likelihood comprises comparing the value to a threshold.

14. The system of claim 10, wherein a compound is a combination of terms that has a different meaning in combination than the terms do separately.

15. A system comprising:
    one or more computers and one or more non-transitory computer-readable storage devices storing instructions that when executed by the one or more computers cause the one or more computers to perform operations comprising:
    identifying three or more consecutive terms in a search query;
    determining a first quantity of search results that (i) are responsive to the search query, and (ii) have been selected by a user;
    determining a second quantity of search results that (i) are responsive to the search query, (ii) have been selected by the user, and (iii) have summaries that include two or more of the consecutive terms;
    determining a value using the first quantity and the second quantity; and
    determining a likelihood that the two or more consecutive terms represent a compound in context of the third term of the three or more consecutive terms, based on the value.

16. The system of claim 15, wherein the summaries comprise titles of the search results.

17. The system of claim 15, wherein the summaries comprise snippets of the search results.

18. The system of claim 15, wherein the operations comprise splitting the two or more terms when the value does not satisfy a threshold.

19. A non-transitory computer-readable medium storing software comprising instructions executable by one or more computers which, upon such execution, cause the one or more computers to perform operations comprising:
    identifying two or more consecutive terms in a search query;
    determining a first quantity of search results that (i) are responsive to the search query, and (ii) have been selected by a user;

determining a second quantity of search results that (i) are responsive to the search query, (ii) have been selected by the user, and (iii) have summaries that include the two or more consecutive terms;

determining a value using the first quantity and the second quantity; and determining a likelihood that the two or more consecutive terms represent a compound based on the value.

20. The medium of claim 19, wherein determining a second quantity of search results comprises determining a second quantity of search results that (i) are responsive to the search query, (ii) have been selected by the user, and (iii) have summaries that include the two or more terms, and in which two or more of the terms appear non-consecutively.

21. The medium of claim 19, wherein determining the value comprises dividing the second quantity by the first quantity.

22. The medium of claim 19, wherein determining the likelihood comprises comparing the value to a threshold.

23. The medium of claim 19, wherein a compound is a combination of terms that has a different meaning in combination than the terms do separately.

24. A non-transitory computer-readable medium storing software comprising instructions executable by one or more computers which, upon such execution, cause the one or more computers to perform operations comprising:

identifying three or more consecutive terms in a search query;

determining a first quantity of search results that (i) are responsive to the search query, and (ii) have been selected by a user;

determining a second quantity of search results that (i) are responsive to the search query, (ii) have been selected by the user, and (iii) have summaries that include two or more of the consecutive terms;

determining a value using the first quantity and the second quantity; and determining a likelihood that the two or more consecutive terms represent a compound in context of the third term of the three or more consecutive terms, based on the value.

25. The medium of claim 24, wherein the summaries comprise titles of the search results.

26. The medium of claim 24, wherein the summaries comprise snippets of the search results.

27. The medium of claim 24, wherein the operations comprise splitting the two or more terms when the value does not satisfy a threshold.

* * * * *